United States Patent
Bobrow

(10) Patent No.: US 7,770,025 B2
(45) Date of Patent: *Aug. 3, 2010

(54) SYSTEM AND METHOD FOR PRESENTING COPY PROTECTED CONTENT TO A USER FROM A PORTABLE STORAGE DEVICE

(75) Inventor: Frederick S. Bobrow, Hopewell Junction, NY (US)

(73) Assignee: Mount Sinai School of Medicine of New York University, New York, NY (US)

( * ) Notice: Subject to any disclaimer, the term of this patent is extended or adjusted under 35 U.S.C. 154(b) by 157 days.

This patent is subject to a terminal disclaimer.

(21) Appl. No.: 12/054,173

(22) Filed: Mar. 24, 2008

(65) Prior Publication Data

US 2008/0215873 A1  Sep. 4, 2008

Related U.S. Application Data

(63) Continuation of application No. 10/854,936, filed on May 26, 2004, now Pat. No. 7,363,510.

(51) Int. Cl.
*G06F 11/30* (2006.01)
(52) U.S. Cl. .................. 713/189; 713/193; 713/2
(58) Field of Classification Search ............. 713/189, 713/193, 2; 726/18, 26
See application file for complete search history.

(56) References Cited

U.S. PATENT DOCUMENTS 5,828,831 A * 10/1998 Kong ..................... 726/18
6,385,721 B1 * 5/2002 Puckette .................... 713/2
7,155,615 B1 * 12/2006 Silvester .................. 713/185
2002/0157027 A1 * 10/2002 Dayan et al. ............. 713/202
2003/0070083 A1 * 4/2003 Nessler ..................... 713/193
2004/0044886 A1 * 3/2004 Ng et al. .................... 713/1
2004/0088513 A1 * 5/2004 Biessener et al. ......... 711/173
2004/0088697 A1 * 5/2004 Schwartz et al. .......... 717/174

* cited by examiner

*Primary Examiner*—Jung Kim
*Assistant Examiner*—Samson B Lemma
(74) *Attorney, Agent, or Firm*—Leason Ellis LLP

(57) ABSTRACT

A device for presenting content to a user is utilized in combination with a general purpose computer. The computer has a processor, a computer communications interface, a computer memory and an operating system. The operating system has one or more file management tools. The device has a housing, a device communications interface and a device memory. The device memory comprises a boot partition which includes boot software. The boot software is copied from the device into the computer memory and is executed from the computer memory by the processor. The device memory also comprises a secure partition inaccessible by the file management tools and having content stored thereon. The device memory also comprises content delivery software, which is copied to the computer memory, and when executed by the processor from the computer memory can access the content from the secure partition and present it to the user as sensory data.

20 Claims, 4 Drawing Sheets

SYSTEM AND METHOD FOR PRESENTING COPY PROTECTED CONTENT TO A USER FROM A PORTABLE STORAGE DEVICE

This application is a Continuation of U.S. patent application Ser. No. 10/854,936, filed May 26, 2004, now allowed, which is incorporated in its entirety by reference herein.

FIELD OF THE INVENTION

This invention is in the general field of portable memory devices and the specific field of copy protected portable content storage devices and methods for use thereof.

BACKGROUND OF THE INVENTION

Modern computing technology allows for various types of content to be encoded onto computer readable media. The ability to copy and manipulate the encoded content poses a difficulty for content providers who wish to limit access to that content and protect their intellectual property rights.

There have been various methods to copy-protect computer readable media. Many of these methods require that play back software follow certain rules. For example, a device may be labeled as copy-protected, which signals to any software that is reading data from the device that the data should not be copied to a hard-drive or another device. This method, however, relies on cooperation from the software. Thus, the content provider must ensure that all software "obeys" copy protection flags. This is often impractical in view of diverse sources of software available today.

There are various methods to ensure that a certain piece of content is played only on a single computer. These methods prevent the creation of useful copies. However, these methods may also pose difficulties to authorized users of the content. Authorized users may wish to play the content on different devices. This is especially true for users that are traveling and thus often need to use more than one computer or computing device.

A variety of portable storage devices are available to consumers. These include older devices, such as floppy disks and zip-disks, and newer generation portable storage devices that do not require an additional device for performing read/write operations such as a floppy drive, or a zip drive. Instead they communicate with a host computer by way of a standard interface (such as an USB port) and perform the read/write operations autonomously, upon instructions received from the host computer. These devices usually include flash memory and an on board controller for performing various read/write operations. An example of such a device is the THUMBDRIVE SMART device manufactured by Trek 2000 International Ltd of Singapore.

Usually, portable memory devices are designed and formatted to allow commonly used operating systems to freely access them. Thus, an operating systems running on a host computer to which a portable device is attached is able to access the portable device, and in turn allow a user of the host computer to view, copy and change the contents of the portable device.

Some of these devices incorporate some security features. However these security features are geared to controlling total access, and not to providing copy protection. For example, the THUMBDRIVE SECURE portable device provides password protection for data stored on it. However, if a user has the correct password, the user may gain full access to the contents of the portable device, including the ability to copy its contents.

There are some portable devices designed to securely store and play content. These include the IPOD offered by Apple Computer, Inc. and the RIO NITRUS offered by Rio Audio. These devices are much more complex than the portable storage devices described above. They include electronics, which decode stored data and convert it into sensory data (usually sound). For this reason, these devices are expensive in relation to the portable storage devices.

What is needed is method and system to store content so that the content is portable and easily viewable on a variety of different computers and computing devices, while also, providing copy-protection for the stored content. The invention addresses these and other needs.

SUMMARY OF THE INVENTION

A protected content storage device is used with a general purpose computer. The general purpose computer has a processor, a computer communications interface, a computer memory and an operating system. The operating system includes one or more file management tools.

The protected content storage device comprises a housing, a device communications interface, and a device memory. The device communications interface is accessible through the housing and is configured to be communicatively connected to the computer communications interface. The device memory is connected to the device communications interface. The device memory comprises a boot partition and a secure partition.

The boot partition is readable by the one or more file management tools of the general purpose computer. A boot software is located on the boot partition. The operating system automatically accesses the boot software through the computer communications interface and the device communications interface. The operating system then copies the boot software into the computer memory and causes the boot software to be executed by the processor from the computer memory.

The secure partition is shielded from the one or more file management tools. The secure partition comprises digitally stored content.

The device memory also comprises content delivery software. This software is configured to read the digitally stored content and present it to the user as sensory data. This happens as a result of (i) copying the content delivery software through the device communications interface and the computer communications interface into the computer memory; and (ii) execution of the content delivery software by the processor from the computer memory.

The digitally stored content is accessible solely by the content delivery software. Thus, the user is precluded access to the digitally stored content in its digital form.

In a further development, the content delivery software is located on the secure partition.

In another further development a remote communications software is also located on the secure partition. The remote communications software is configured to cause the general purpose computer to communicate with a remote computer connected to the general purpose computer by a computer network. Furthermore, the remote communications software is configured to retrieve additional content from the remote computer and store the additional content in the secure partition. The remote communications software performs these actions as a result of (i) copying the remote communications software through the device communications interface and the computer communications interface into the computer memory and (ii) execution of the remote communications software by the processor from the computer memory.

Another aspect of the present invention is a method is a method for presenting content to a user utilizing a general purpose computer. The general purpose computer has a processor, a computer communications interface, a computer memory and an operating system. The operating system has one or more file management tools.

According to this method, a device having a device communications interface, a housing and a device memory is provided. The device memory further comprises a boot partition and a secure partition. The secure partition is shielded from the one or more file management tools. The device communications interface and the computer communications interface are brought into communication with one another. A boot software is copied from the boot partition of the device memory through the device communications interface and the computer communications interface into the computer memory. Execution of the boot software is initiated after it is copied. The boot software is executed by the processor from the computer memory.

A content delivery software is copied from the device memory through the device communications interface and the computer communications interface into the computer memory. Execution of the content delivery software is initiated after it is copied. The content delivery software is executed by the processor from the computer memory.

Digitally stored content is transferred from the secure partition of the device through the device communications interface and the computer communications interface into the computer memory. The digitally stored content is presented to the user as sensory data using the content delivery software. The digitally stored content is accessible solely by the content delivery software, whereby the user is precluded access to the digitally stored content in its digital form.

In a further development, the content delivery software is included in the secure partition. A remote communications software is copied from the device memory through the device communications interface and computer communications interface into the computer memory. Execution of the remote communications software is initiated. The remote communications software causes the general purpose computer to communicate with a remote computer connected to the general purpose computer by a computer network. The remote communications software retrieves additional content from the remote computer. The additional content is stored in the secure partition.

BRIEF DESCRIPTION OF THE DRAWINGS

The foregoing and other features of the present invention will be more readily apparent from the following detailed description and drawings of the illustrative embodiments of the invention wherein like reference numbers refer to similar elements and in which.

DETAILED DESCRIPTION OF THE DISCLOSED EMBODIMENTS

A system according to the present invention is preferably embodied in used in conjunction with a portable storage device 100. There are various commercially available portable storage devices. They include flash memory devices such as the THUMBDRIVE SMART manufactured by Trek 2000 International Ltd of Singapore. Other portable storage devices may be used including devices that are not flash-memory based.

The use of a portable storage device 100 provides many advantages for content publishers. Such devices have a relatively low price, and thus may be given away or sold with the content pre-installed. For most portable storage devices, the content is easy to store even if a small number of devices is used. Thus the portable storage devices may be distributed in a manner similar to that of diskettes, CDs and DVDs, but include additional features when configured in accordance with the below described embodiments. The additional features include copy protection and the ability to choose and download additional content and/or update the content.

Various types of content may be stored on the portable device 100. These include music, video, text, such as electronic books, and presentations. The storing of presentations provides some additional benefits. First, the portable device allows for efficient storage of content. Furthermore, since most portable devices allow multiple rewrites, last minute changes can be easily made. In addition, the remote communication features described below allow for updating of the content, or adding new content to the portable device 100, which is especially useful in presentations because they often refer to additional material.

Figure 1:
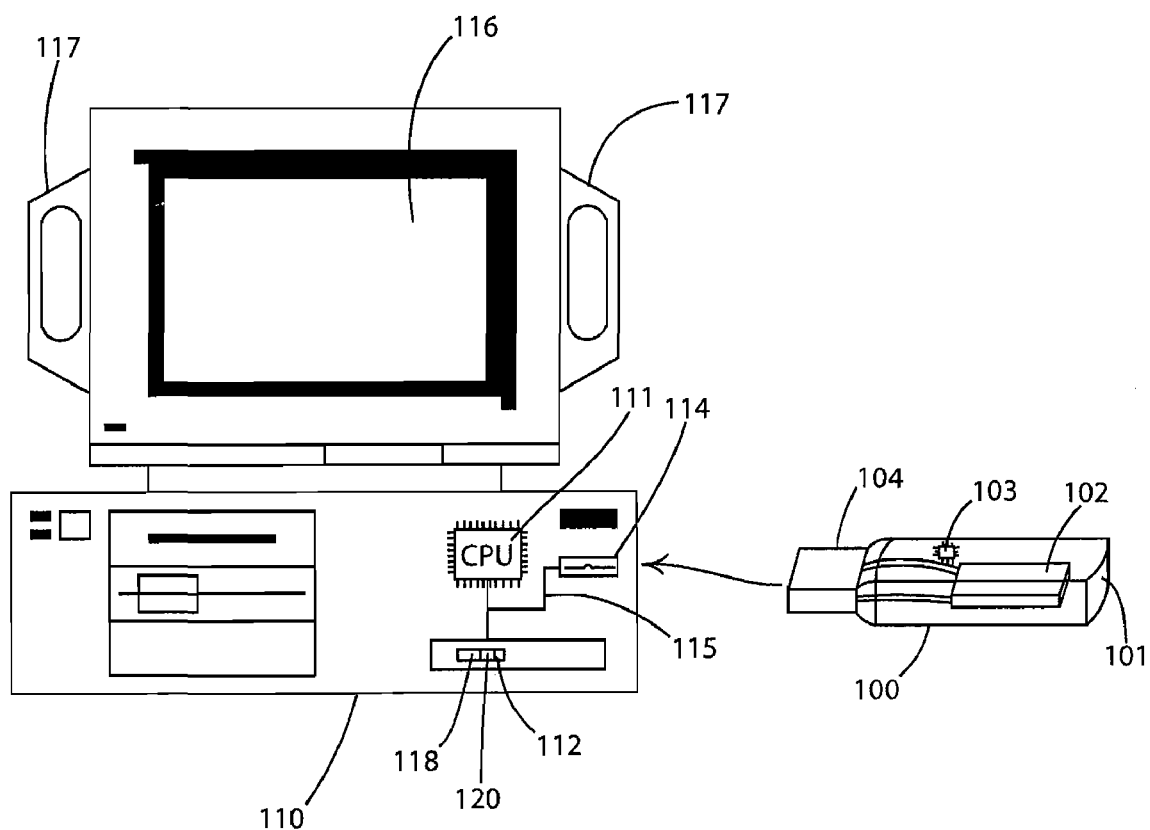
FIG. 1 is a diagram showing a portable device being connected to a computer.

FIG. 1 is a diagram of a portable device 100 as it is being connected to a computer 110. Computer 110 may be a personal computer, a laptop, a portable computing device, or any other computing device that is generally programmable and includes an interface capable of presenting content to a user. Computer 110 further includes a processor (or central processing unit) 111 and a computer memory 112. The computer memory stores data and instructions. The processor executes instructions and processes data from the computer memory. The processor and the computer memory are connected by a bus 115 in a conventional manner.

The computer includes at least one computer communications interface 114. The computer communications interface may be a Universal Serial Bus (USB) compliant port. The Universal Serial Bus is a known standard for interconnection between various electronic devices. The USB standard as well as other related information may be found at http://www.usb.org. Computer communications interface 114 may also comprise a serial port, a parallel port, a PS/2 port or another interface suitable for connecting electronic devices to the computer. Computer communications interface 114 need not be a physical connection interface. It may be, for example, a BLUETOOTH interface. BLUETOOTH is a known technology for providing short distance wireless connections between electronic devices. The BLUETOOTH standard, as well as other relevant information, may be found at http://www.bluetooth.com. Alternatively, the computer communications interface may be an infrared or laser communication interface. Computer communications interface 114 is also connected to the processor 111.

Computer 110 also includes a screen 116 and speakers 117. The screen and speakers are used for presenting content to the user. If computer 110 is a portable computing device, it's screen and speakers may be smaller, or integrated into each other. Furthermore, the screen and/or the speakers may be lacking in certain computing devices. Thus, computer 110 may include a screen only (such as the case with most PDA's), or speakers only, or headphones in lieu of speakers. Computer 110 should include or be connected to at least one interlace for presenting content to a user as sensory data (i.e., sound, visuals, or both).

Computer 110 may also include many additional components, such as a hard drive, a network card, a CD drive, a DVD drive, a power supply, a mother board, video and sound controllers, keyboard, mouse, etc. These are known in the art and omitted in the present description for the sake of brevity.

The computer memory further comprises an operating system 118 (shown schematically). The operating system manages execution of programs, as well as various input/output functions. The operating system may be one of the currently available operating systems, such as WINDOWS XP offered by Microsoft Corp., LINUX offered by various distributors, including Red Hat, Inc., or OS X offered by Apple Computer. The operating system may also be an operating system suited for portable or embedded computing devices, such as PALM OS offered by PalmSource, Inc. The operating system 118, includes (or has access to) functionality for managing the computer communications interface 114 in accordance with a standard associated with the computer communications interface. For example, in the case of a USB interface, the operating system may implement the USB 2.0 standard available at http://www.usb.org.

The operating system 118 comprises one or more file management tools 120 (also shown schematically). The file management tools are tools that allow the user of computer 110 to access and manipulate data on various storage devices. These include tools such as the Windows Explorer of the WINDOWS XP operating system, or the command shell for the UNIX and LINUX operating systems.

Device 100 is a portable storage device such as the THUMBDRIVE SMART manufactured by Trek 2000 International Ltd of Singapore, or the DISKONKEY device manufactured by M-Systems of Kfar Saba, Israel. Device 100 comprises a housing 101. The device also comprises a device communications interface 104, which is accessible through the housing. The device communications interface 104 is of the same type as the computer communications interface 114. Furthermore, whenever the standard of the interface requires complimentary fittings (such as "male" and "female" adaptors), the device communications interface is complimentary to the computer communications interface.

The device 100 also includes a device memory 102. The device memory 102 may be a flash memory. The device 100 also includes a controller 103. The controller is used for performing certain memory functions, such as read, write based on commands received from the device communications interface. The controller may also be used to perform communication functions to perform communications and identify the device to the computer 110 in accordance with the communications protocol of the computer and device communications interfaces. In the preferred embodiment, the controller is configured to perform the functions performed by the controller of the THUMBDRIVE SMART device (but not that of the THUMBDRIVE SECURE device). The controller may be, for example, an application specific integrated circuit (ASIC), or a programmable processor. In the preferred embodiment, the controller does not perform any functions related to security or content presentation, such as decryption, decoding of content, etc. Furthermore, in the preferred embodiment the controller is not configured to execute any software located on the memory. If the controller is a programmable processor, it is preferred that it executes software from a dedicated read only memory or a similar dedicated memory which is separate from the device memory 102. The device 100 may also include additional elements, such as a power source, light emitting diodes, etc., which are not described but which are known in the art.

Device 100 is connected to computer 110 by connecting the computer communications interface 114 and the device communications interface 104. If the communications interfaces require physical attachment, the connection is made by simply "plugging" the device communications interface into the computer communications interface. If the device communications interface does not require physical attachment, the connection is made by bringing the device communications interface 104 in communicative contact with the computer communications interface 114 (e.g. within radio range or into a line of sight).

Figure 2:
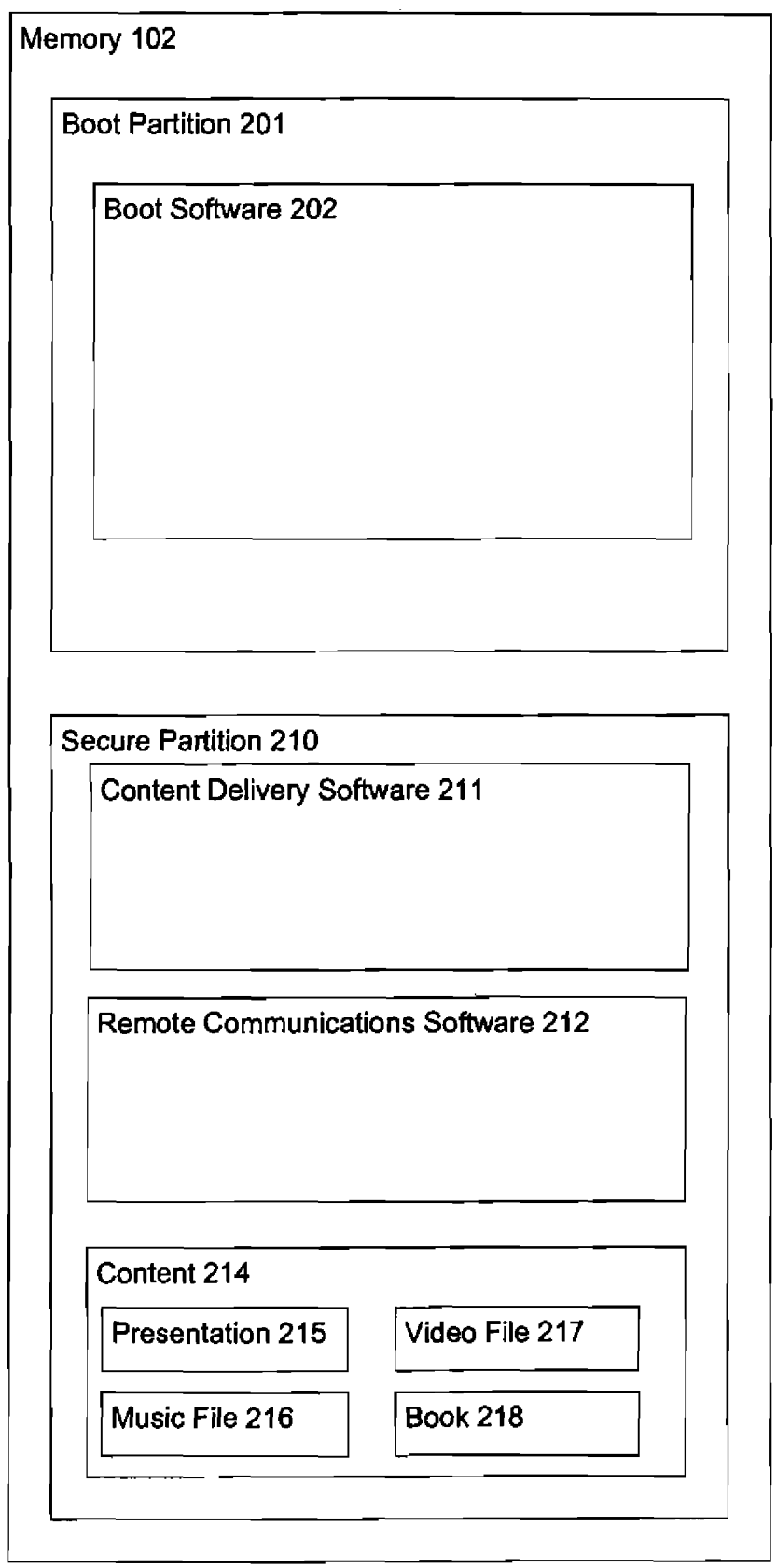
FIG. 2 is a block diagram of the device memory of the portable device.

FIG. 2 is a logical block diagram of the device memory 102 of the portable device 100. The memory 102 comprises at least two partitions—a boot partition 201 and a secure partition 210. A partition is a logical section of a storage device. By "logical" it is meant that the partition is defined by various data and the conduct of the computer system and software, and need not refer to an actual physical division within the storage device. Creating partitions in a storage device is a technique which is known in the art. Partitions are treated as different storage devices by most higher level operating system modules, such as the file management tools 120, and other software. Data on different partitions may be and often is organized in different manner. Thus, for example, two different partitions may include data organized according to two different file systems.

Some currently used operating systems do not allow partitioning in portable storage devices. In order to use partitions in connection with these operating systems, the portable device must identify itself to the operating system as something other than a portable storage device such as, for example, a hard-drive. Thus, the portable device figuratively "tricks" the operating system by simulating a hard-drive in order to ensure that the operating system recognizes its partitions.

Boot partition 201 is generally accessible to the operating system. It includes boot software 202 which is also generally accessible. The boot partition and boot software are configured to take advantage of an "autorun" feature of the operating system. The "autorun" feature is included in many operating systems (such as the WINDOWS family of operating systems) and causes the operating system to automatically access, load and execute certain software included in a storage device upon connection of the storage device or insertion of a storage medium (such as a CD) into the storage device. Methods for invoking the "autorun" feature are known in the art.

Device memory 102 also includes a secure partition 210. The secure partition 210 is not accessible by a user of the computer 110 by way of the one or more file management tools 120. This can be achieved by several methods. For example, if supported by the operating system 118, an instruction can be conveyed to the operating system that the secure partition 210 is to be treated as hidden and not accessed by the user. Alternatively, the data of the secure partition can be organized in format not supported by the operating system 118. For example, a file system not supported by the operating system 118 can be used. The latter method provides a more secure arrangement, as the first method is more easily compromised by unwanted modifications or "hacks" of the operating system 118. However, the secure partition can be accessible to lower level operating system modules, such as API's, drivers and others.

The secure partition 210 includes content 214, which is digitally stored on the secure partition. Preferably, the secure partition 210 further includes content delivery software 211, and remote communications software 212. Alternatively, the content delivery software 211 and the remote communications software 212 can be placed in the boot partition, or in a third partition (not shown). The remote communications software 212 can also be omitted in some implementations.

Content 214 can include one or more of the following types of content: presentations 215, music files 216, video files 217, and text or books stored in electronic format 218, as well as other content. Content 214, can be encoded in various formats, including but not limited to PDF, PPT, CCT, EXE, TAR, CAB, ZIP, INI, TXT, MPEG, AVI, DIVX, MP3, WAV, AIFF, MOV, QT, MOV, ASF, WMA, WMV and WMP. Content 214, or any other data or software included in the secure partition is optionally encrypted.

Figure 3:
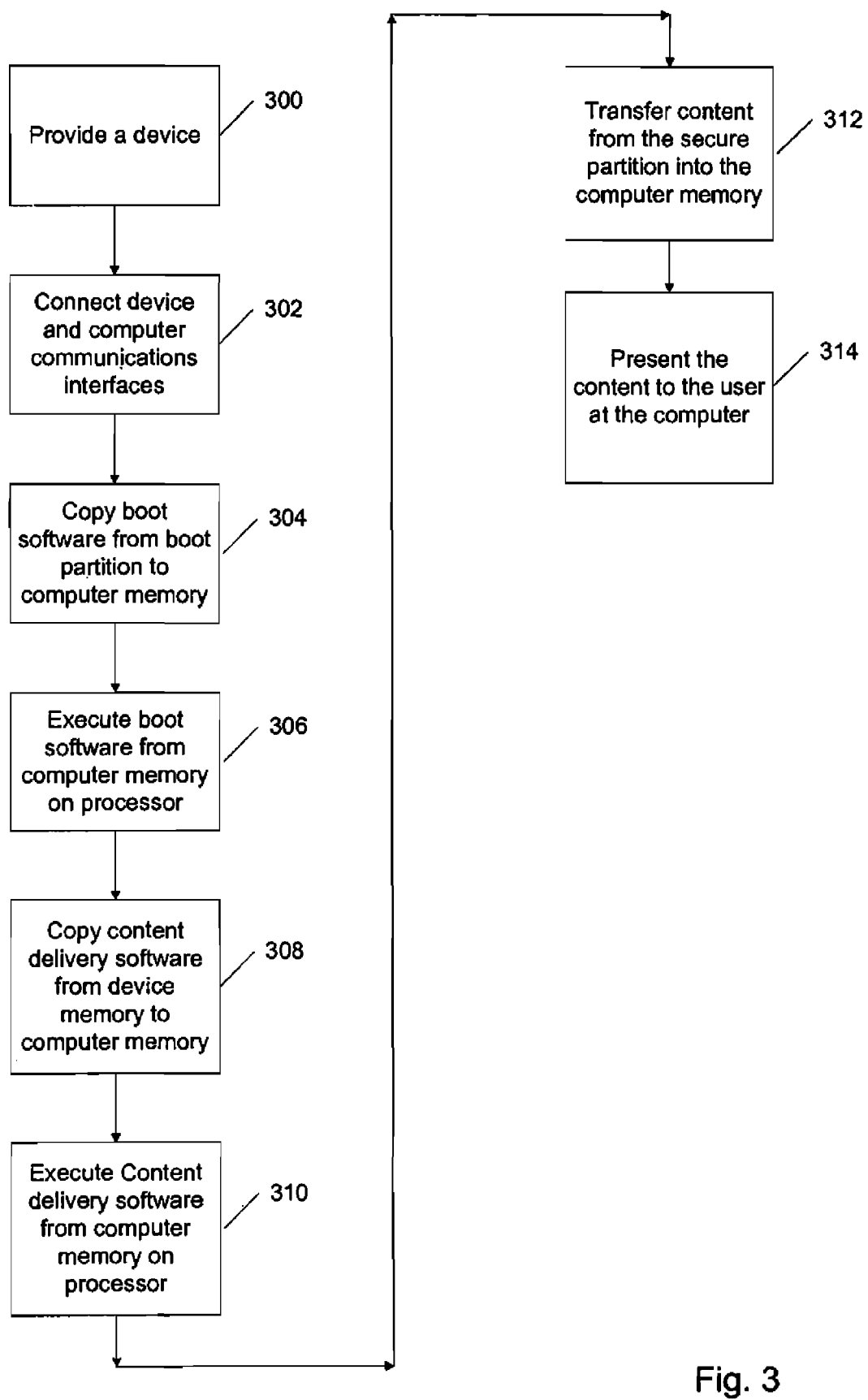
FIG. 3 is a flow chart showing a method for presenting copy protected content to a user.

FIG. 3 is a flow chart showing a method for presenting copy protected content to a user. First at step 300 a device similar to the portable memory device 100 is provided. In step 302 the device is connected to the computer 110 by connecting the device communications interface 104 to the computer communications interface 114.

In step 304, due to the configuration of the boot software 202 and the boot partition 201, the "autorun" feature of the operating system 118 is triggered and as a result the operating system 118 accesses the boot partition 201, accesses the boot software 202 within the boot partition, and copies the boot software from the boot partition through the device communications interface 104 and the computer communications interface 114 into the computer memory 112 (step 304). The operating system causes the boot software 202 to be executed by the processor 111 from the computer memory 112 (step 306). As an alternative, in order to accommodate operating systems that do not have the "autorun" feature, the user may execute steps 304 and 306. In this case, the user causes the operating system to copy the boot software by using the file management tools 120, and executes the boot software using operating system commands.

Optionally, the boot software authenticates the device 100 after executing. This requires that controller 103 be provided with a predetermined unique identification number which is permanently saved in the controller's hardware. A copy of this number is also saved on the device memory 102 (preferably in the secure partition). The boot software accesses the copy saved on the device memory 102 and obtains the number saved in the controller 103 by issuing a predetermined command to the controller. The boot software then determines whether the copy saved in the device memory 102 is the same as the one saved in the controller 103. This ensures that the contents of the device memory 102 have not been illicitly copied from another device. If the contents were copied from another (source) device the number saved in the device memory would not equal the number saved in the controller, it would instead reflect the number saved in the controller of the source device.

In step 308, the content delivery software 211 is copied from the device memory 102 through the device communications interface 104 and the computer communications interface 114 into the computer memory 112. This copying may involve access to the secure partition 210, since the content delivery software is preferably placed there. In step 310, the content delivery software is caused to be executed by the processor 111 from the computer memory 112. It is preferred that steps 308 and 310 are performed or at least caused to be performed by the boot software. Thus, if access to the secure partition is required (i.e., the content delivery software is placed on the secure partition), the boot software is configured to access the secure partition and overcome any measures that are used to limit access to the secure partition. Thus, if an alternative file system is used for the secure partition (as described above), the boot software 202 is provided with the functionality necessary to access the alternative file system. Similarly, the boot software is provided with the functionality necessary to remove any encryption that may be used on the content delivery software.

In step 312, the content 214 is retrieved from the secure partition 210 through the device communications interface 104 and the computer communications interface 114 into computer memory 112. This may be done by the content delivery software 211 or the boot software 202. Once again, the secure partition 210 needs to be accessed.

In step 314, the content delivery software presents the content to the user. This is done by decrypting the content (optionally, the boot software 202 may perform some or all decrypting steps), decoding the content, and sending commands and data to one or more user interface devices, such as screen 116 and speakers 117 in order to present the content in sensory form to the user. Sensory form may include audio form, visual form, and any other form capable of conveying information to a person. The content delivery software may also provide presentation management tools for the user, such as volume controls, tools for fast forwarding or reversing a video or audio stream, tools for skipping presentation slides, or annotating text, tools for choosing another piece of content to be copied from the secure partition and presented and others.

Figure 4:
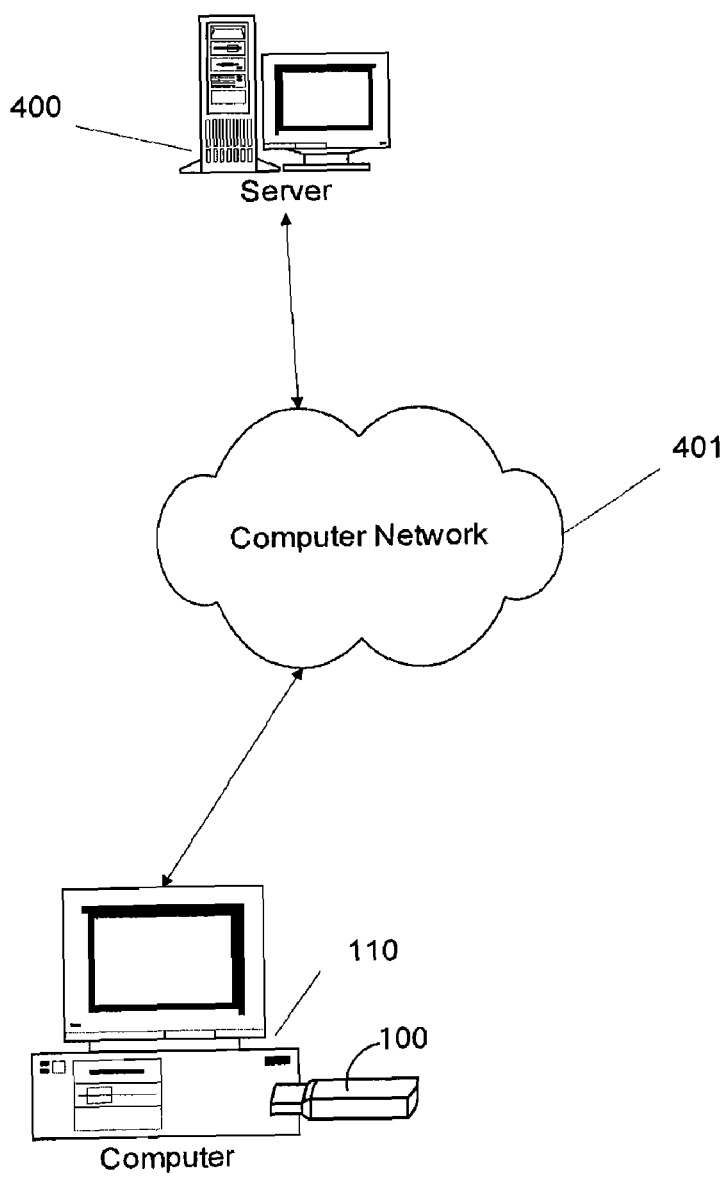
FIG. 4 is a network diagram showing configuration suitable for retrieval of additional content.

Furthermore, the content delivery software 211 may allow the user to securely download and store at the device 100 additional content and/or updates to the existing content. FIG. 4 is a block diagram showing the retrieval of additional content and updates.

The computer 110 is connected to device 100, as described above. Furthermore, computer 110 is connected to a computer network 401. The computer network may be the Internet, an Intranet, or any other local or wide area network. Computer network 401 may include various wireless networks as well. A server 400 is also connected to the computer network 401. The server 400 is a computer or another computing device which provides a service to other devices over a network. Server 400 includes content not included in the device 100 (additional content), and/or updates to the content included on the device 100.

In order to enable remote communications, the remote communications software 212 is copied from the memory 102 through the device communications interface 104 and the computer communications interface 114 into the computer memory 112. The remote communications software is then caused to be executed by processor 111 from computer memory 112. This may be done by the content delivery software 211 or the boot software 202.

The remote communications software 212 initiates communications with a remote computer, such as server 400, over the computer network 401. This is performed by issuing commands to various network tools of the computer 110 in order to cause computer 110 to communicate with server 400.

It is preferable that computer 110 communicates with server 400 using a secure protocol, such as the SSL protocol.

Thus, the chance of a third party "listening in" on the communications and obtaining an unauthorized copy is decreased. In order to her increase copy protection a secure handshake which is not publicly disclosed can be used. An exemplary secure handshake includes a challenge from server 400 to computer 110, and a response from computer 110 to server 400, the response including a secure code, such as a password, or a directory path on the server 400.

Once a connection is established server 400 sends additional content and/or updates to the computer 110 over the network 401. The content delivery software and/or the network communications software provide the user with an interface allowing the user to browse additional content and updates available at the server 400 and choose specific content and/or updates to be downloaded. Furthermore, the server can be configured to automatically send certain content or updates upon establishing a connection with the computer 110 and the remote communications software 212. Alternatively, the remote communications software can automatically request certain content from the server based on information previously saved in the device memory 102.

Once the content is downloaded it is stored in the computer memory in order to be played by the content delivery software. Alternatively or in addition, the content is saved into the secure partition of the device 100. In order to better facilitate saving of additional content, the device 100 further includes content management software (not shown) which allows a user to remove content already saved on the device 100 in order to free up storage space for new content.

In an exemplary embodiment, the above described process is used for transfer of updates or modifications to the software interface and related support files, as well as transfer of new content or updates and modifications to the existing content. In order to ensure the security of the system, the following restrictions are placed on communications with a server in the exemplary embodiment. Once deployed to the end user, the device may communicate, allow updates, or accept modification only via a network connection to a predefined server using a predefined protocol. The device software, and related support file(s), accept update information only in the presence of a bi-directional communication link and after an identification handshake from the server, at which time the server-based application sends data to the device. Updates to software, files or other media present on the device may be initiated solely by the server-side application. These updates can be downloaded from the server solely by a predefined software which is available on the device, but is preferably not otherwise distributed. The predefined software is operative to read the updates, only if it is executed as a result of copying the predefined software from a device connected to a computer and executing the predefined software while the device is still connected to the computer and in the presence of a network connection.

While the foregoing description and drawings represent illustrative embodiments of the present invention, it will be understood that various changes and modifications may be made without departing from the spirit and scope of the present invention.

I claim:

1. For use with a general purpose computer having a processor, a computer communications interface, a computer memory and an operating system having one or more file management tools, a protected content storage device for presenting content to a user, the device comprising:
  a housing;
  a device communications interface accessible through the housing and configured to be communicatively connected to the computer communications interface; and
  a portable device memory connected to the device communications interface, the device memory comprising:
  a boot partition which is readable by the one or more file management tools of the general purpose computer;
  a boot software located in the boot partition and configured to cause the operating system to automatically access the boot software through the computer communications interface and the device communications interface, copy the boot software into the computer memory, and cause the boot software to be executed by the processor from the computer memory;
  a secure partition shielded from the one or more file management tools;
  digitally stored content in the secure partition; and
  a content delivery software contained within the secure partition and configured to read the digitally stored content and present it to the user as sensory data as a result of copying the content delivery software through the device communications interface and the computer communications interface into the computer memory and as a result of execution of the content delivery software by the processor from the computer memory,
  wherein the digitally stored content is accessible solely by the content delivery software, whereby the user is precluded access to the digitally stored content in its digital form.

2. The device of claim 1, wherein the content delivery software is located on the secure partition, and the boot software is further configured to copy the content delivery software through the device communications interface and the computer communications interface into the computer memory and cause the content delivery software to be executed by the processor from the computer memory.

3. The device of claim 1, wherein the device memory further comprises remote communications software configured to:
  cause the general purpose computer to communicate with a remote computer connected to the general purpose computer by a computer network;
  retrieve additional content from the remote computer, and store the additional content in the secure partition, as a result of copying the remote communications software through the device communications interface and the computer communications interface into the computer memory and as a result of execution of the remote communications software by the processor from the computer memory.

4. The device of claim 3, wherein the general purpose computer and the remote computer communicate using a secure handshake.

5. A computer-implemented method for presenting content to a user utilizing a general purpose computer having a processor, a computer communications interface, a computer memory and an operating system having one or more file management tools, the method comprising the steps of:
  providing a portable device having a device communications interface, a housing and a device memory, the device memory further comprising a boot partition and a secure partition;
  bringing the device communications interface and the computer communications interface into communication with one another;

copying a boot software from the boot partition of the device memory through the device communications interface and the computer communications interface into the computer memory;

causing the boot software to be executed by the processor from the computer memory after copying the boot software;

copying a content delivery software from the secure partition of the device memory through the device communications interface and the computer communications interface into the computer memory;

causing the content delivery software to be executed by the processor from the computer memory after copying the content delivery software;

transferring digitally stored content from the secure partition of the device through the device communications interface and the computer communications interface into the computer memory; and presenting the digitally stored content to the user as sensory data using the content delivery software, while shielding the secure partition from the one or more file management tools, wherein the digitally stored content is accessible solely by the content delivery software, whereby the user is precluded access to the digitally stored content in its digital form, wherein at least one of the foregoing steps is executed by the processor.

6. The method of claim 5, wherein the content delivery software is included in the secure partition, and the step of copying the content delivery software is performed by the boot software.

7. The method of claim 5, further comprising the steps of:
copying a remote communications software from the device memory through the device communications interface and computer communications interface into the computer memory and causing the remote communications software to execute;

causing the general purpose computer to communicate with a remote computer connected to the general purpose computer by a computer network, this step being performed by the remote communications software;

retrieving additional content from the remote computer, by the remote communications software; and storing the additional content in the secure partition.

8. The method of claim 7, further including the step of performing a secure handshake between the general purpose computer and the remote computer.

9. For use with a general purpose computer having a processor, a computer communications interface, a computer memory and an operating system having one or more file management tools, a protected content storage device for presenting content to a user, the device comprising:
a housing;
a device communications interface accessible through the housing and communicatively connectable to the computer communications interface; and
a portable device memory connected to the device communications interface, the device memory comprising:
a boot partition readable by the one or more file management tools of the general purpose computer;
a boot software located in the boot partition usable by the operating system to automatically access the boot software through the computer communications interface and the device communications interface, copy the boot software into the computer memory, and cause the boot software to be executed by the processor from the computer memory;
a secure partition shielded from the one or more file management tools and configured to store digital content; and
a content delivery software contained within the secure partition and accessed by the boot software so that, in response to execution of the boot software, the content delivery software is copied from the secure partition and into the computer memory processor, across the device communications interface, and thereafter executed by the computer, the content delivery software being operable to read the digital content in the secure partition and present it to the user as sensory data to the exclusion of the one or more file management tools.

10. The device of claim 9, wherein sensory data comprises audio data, visual data or a combination of audio and visual data.

11. The device of claim 9, wherein the device memory further comprises a remote communications software configured to initiate a communication between the general purpose computer and a remote computer.

12. The device of claim 9, wherein the device memory further comprises a remote communications software configured to:
retrieve additional content from the remote computer, and store the additional content in the secure partition.

13. The device of claim 12, wherein the remote communication software stores the additional content in the secure partition as a result of copying the remote communications software through the device communications interface and the computer communications interface into the computer memory and as a result of execution of the remote communications software by the processor from the computer memory.

14. For use with a general purpose computer having a processor, a computer communications interface, a computer memory and an operating system having one or more file management tools, a protected content storage device for presenting content to a user, the device comprising:
a housing;
a device communications interface accessible through the housing and communicatively connectable to the computer communications interface; and
a portable device memory connected to the device communications interface, the device memory comprising:
a boot partition having boot software therein that is generally accessible to the operating system of the general purpose computer;
a secure partition shielded from the one or more file management tools and configured to store digital content; and
a content delivery software contained within the secure partition and operable, after execution of the boot software, to read the digital content in the secure partition and present it to the user as sensory data to the exclusion of the one or more file management tools,
wherein the digitally stored content is accessible solely by the content delivery software, whereby the user is precluded access to the digitally stored content in its digital form.

15. The device of claim 14, wherein the boot partition is readable by the one or more file management tools of the general purpose computer, and wherein the boot software is located in the boot partition and usable by the operating system to automatically access the boot software through the computer communications interface and the device communications interface, copy the boot software into the computer memory, and cause the boot software to be executed by the processor from the computer memory.

16. The device of claim 14, wherein sensory data comprises audio data, visual data or a combination of audio and visual data.

17. The device of claim 14, wherein the device memory further comprises a remote communications software configured to initiate a communication between the general purpose computer and a remote computer.

18. The device of claim 14, wherein the device memory further comprises a remote communications software configured to:

retrieve additional content from the remote computer, and store the additional content in the secure partition.

19. The device of claim 18, wherein the remote communication software stores the additional content in the secure partition as a result of copying the remote communications software through the device communications interface and the computer communications interface into the computer memory and as a result of execution of the remote communications software by the processor from the computer memory.

20. The device of claim 14, wherein the content delivery software is configured to be copyable from the secure partition into the computer memory processor, across the device communications interface, and thereafter executable by the computer.

* * * * *